Patented Oct. 5, 1948

2,450,717

UNITED STATES PATENT OFFICE 2,450,717

METHOD OF RECOVERING DEXTRINS FROM STILLAGE SIRUP

Harold W. Coles, Rochester, N. Y., assignor to Joseph E. Seagram & Sons, Inc., Shively, Ky., a corporation of Indiana No Drawing. Application July 27, 1944, Serial No. 546,939

3 Claims. (Cl. 127—34)

It is known that thin distillery slop or thin stillage contains dextrins, the recovery of which presents a problem. It has been proposed to recover dextrins by evaporating the stillage to a syrup, mixing the syrup with alcohol to precipitate the dextrins while placing the impurities in solution; and separating the precipitate from the mixture. The present invention relates to an improvement in this general process.

The principal object of the invention is to provide an improved process which enables the quantity and quality of the dextrins recovered to be substantially increased.

Another object is to produce a dextrin precipitate which is substantially free of all gums and which contains less of the other impurities than is contained in the precipitate produced by the general alcohol treatment above noted.

In carrying out my invention, the stillage, which is inherently acidic, is evaporated to a syrup; the acidic syrup dialyzed to remove a large proportion of its impurities; the dialyzer syrup treated with hydrochloric acid amounting to 1 to 5% by volume of the moisture content of the syrup; and thereafter treated with alcohol as before.

I have discovered that by dialyzing the syrup thru a membrane it is possible to remove as much as 92% of the copper reducing substances, inorganic salts, ash-containing and nitrogen-containing constituents and other impurities of low molecular weight.

I have found also that when the syrup is treated with hydrochloric acid, the quality of the dextrins is substantially improved, for reasons not yet ascertained. This unexpected result is not produced by the organic acids which apparently are too weak and it can not be satisfactorily obtained by the use of sulphuric or nitric acids because of their oxidizing effect. The concentration of hydrochloric acid should be limited to values not substantially in excess of 5% in order to avoid or minimize any action of the acid on the dextrins. Good results are obtainable with a controlled quantity of acid ranging from 1 to 5% by volume of the moisture content of the syrup, the solids content being ignored.

Furthermore, upon acidification, the materials should not be permitted to stand for any length of time since the acid may ultimately attack the dextrin. Accordingly, upon acidification, the acidified syrup is promptly mixed with ethyl alcohol amounting to 70% by volume of the moisture content of the syrup. Upon this addition the alcohol causes most of the remaining impurities to go into solution and effects the precipitation of the dextrins. The resulting precipitate contains about 62% dextrin on a dry basis. If desired, the dextrin precipitate recovered from the acidified, alcohol-treated syrup may be further treated one or more times with ethyl alcohol in an amount equal to 70% by volume of the moisture content of the precipitate in order to place additional impurities into solution and thereby increase the purity of the recovered dextrins. For example, one additional treatment, which is preferred, will normally raise the dextrin content of the precipitate from 62% to 68% on a dry basis. The dextrins recovered in the practice of this process appear to be entirely free of gums and substantially free of ash, sugar constituents and other impurities.

Having described my invention I claim:

1. A method of recovering dextrins from stillage syrup comprising: acidifying the syrup with a quantity of hydrochloric acid ranging approximately from 1 to 5% by volume of the moisture content of the syrup; and mixing the acidified syrup with sufficient alcohol to place impurities in solution and to precipitate the dextrins.

2. A method of recovering dextrins from stillage syrup comprising: dialyzing syrup thru a membrane to remove some of its impurities; mixing the dialyzed syrup with a quantity of hydrochloric acid ranging approximately from 1 to 5% by volume of the moisture content of the syrup; and mixing the acidified syrup with sufficient alcohol to place remaining impurities in solution and to precipitate the dextrins.

3. A method of claim 2 wherein the dextrin precipitate is treated with alcohol at least one more time to place additional impurities in solution and to precipitate a purer form of dextrin.

HAROLD W. COLES.

REFERENCES CITED

The following references are of record in the file of this patent:

FOREIGN PATENTS

| Number | Country | Date |
|---|---|---|
| 9,243 | Great Britain | 1884 |